United States Patent [19]

Curulla

[11] Patent Number: 4,556,531
[45] Date of Patent: Dec. 3, 1985

[54] NUCLEAR FUEL ASSEMBLY SPACER AND SPRING COMPONENT THEREFOR

[75] Inventor: Michael V. Curulla, San Jose, Calif.

[73] Assignee: General Electric Company, San Jose, Calif.

[21] Appl. No.: 486,525

[22] Filed: Apr. 19, 1983

[51] Int. Cl.[4] ............................................... G21C 3/34
[52] U.S. Cl. ................................... 376/441; 376/442; 267/164
[58] Field of Search ................. 376/441, 442; 267/164, 267/165

[56] References Cited

U.S. PATENT DOCUMENTS

| | | | |
|---|---|---|---|
| 1,037,729 | 9/1912 | Collins | 267/165 |
| 2,600,520 | 6/1952 | Spase | 267/164 X |
| 3,298,922 | 1/1967 | Prince et al. | 376/441 |
| 3,301,765 | 1/1967 | Eyre et al. | 376/441 X |
| 3,380,890 | 4/1968 | Glandin et al. | 376/441 |
| 3,398,053 | 8/1968 | Huber et al. | 376/442 |
| 3,510,397 | 5/1970 | Zettervall | 376/441 |
| 3,654,077 | 4/1972 | Lass et al. | 376/441 X |
| 3,769,159 | 10/1973 | Zinn et al. | 376/441 |
| 3,772,148 | 11/1973 | Seddon | 376/441 |
| 3,886,038 | 5/1975 | Raven | 376/441 X |
| 4,172,761 | 10/1979 | Raven et al. | 376/441 X |
| 4,252,302 | 2/1981 | Musgrave | 267/165 |
| 4,291,480 | 9/1981 | Musgrave | 267/165 X |
| 4,312,705 | 1/1982 | Steinke | 376/442 X |

*Primary Examiner*—Deborah L. Kyle
*Assistant Examiner*—Dan Wasil
*Attorney, Agent, or Firm*—Ivor J. James, Jr.; Samuel E. Turner; Raymond G. Simkins

[57] ABSTRACT

In a nuclear fuel assembly spacer providing passages for fuel rods or other elongated elements, a spring component of H-shape including a pair of spaced spring members of hairpin-like configuration connected by a retaining strap wherein an arched side of one of the spring members projects into one of the passages and the arched side of the other of the spring members projects into an adjacent one of the passages for resilient engagement with the fuel rods or other elongated elements extending through the passages.

7 Claims, 5 Drawing Figures

4,556,531

NUCLEAR FUEL ASSEMBLY SPACER AND SPRING COMPONENT THEREFOR

BACKGROUND

This invention relates to fuel rod spacers as used in fuel assemblies for the cores of nuclear power reactors and to a spring component for use in such spacers. Such nuclear reactors are discussed, for example, by M. M. Eli-Wakil in Nuclear Power Engineering (McGraw-Hill, 1962).

An example of a nuclear fuel rod or element, comprising nuclear fuel in a sealed tube, is shown in U.S. Pat. No. 3,365,371. A plurality of fuel rods grouped together to form a fuel assembly is shown, for example, in U.S. Pat. No. 3,431,170.

A variety of fuel rod spacers have been proposed and used in such fuel assemblies. Examples include spacers such as shown in U.S. Pat. Nos. 3,654,077 and 3,886,038.

This invention is particularly useful in spacers of the ferrule type (a spacer formed of an array of cojoined tubular ferrules) as shown by Matzner et al in U.S. patent application Ser. No. 410,124, filed Aug. 20, 1982, now U.S. Pat. No. 4,508,679, issued Apr. 2, 1985, assigned to the same assignee herein, which application is hereby incorporated by reference herein.

In the above-referenced application, the spring members of the spacer thereof have a generally elliptical shape and are supported by oppositely directed tabs formed by C-shaped cutouts in the walls of adjacent ferrules of the spacer.

An object of this invention is a spacer spring component which provides freedom in selection of spring characteristics (for example, length and width) of the spring members.

Another object is a ferrule type spacer wherein the separately formed spring members thereof are retained in position without the need of cutouts in the ferrule walls.

SUMMARY

These and other objects of the invention are achieved by a spacer formed of an array of cojoined tubular ferrules wherein each ferrule provides a passage for a fuel rod or other elongated element of a fuel assembly.

Spring members projecting into each of the ferrules, to provide resilient lateral support of the fuel rod or other element extending through the ferrule, are provided by a spring component of generally H-shape including a pair of spaced apart spring members of generally hairpin-like configuration connected by a retaining strap.

Each of the spring members of such spring component is fitted over the wall of one of a pair of adjacent ferrules of the spacer whereby an arched side of one of the spring members projects into one of the pair of adjacent ferrules and the arched side of the other of the spring members of the spring component projects into the other of the pair of adjacent ferrules for resilient engagement with the fuel rods or other element extending through the ferrules by which the element is urged into engagement with laterally spaced rigid stops projecting into the ferrule.

The retaining strap, connecting the two spring members of the component, is fitted into facing recesses formed in the adjacent walls of the adjacent ferrules by which the spring component, is retained in position.

DRAWING

DESCRIPTION

Figure 1:
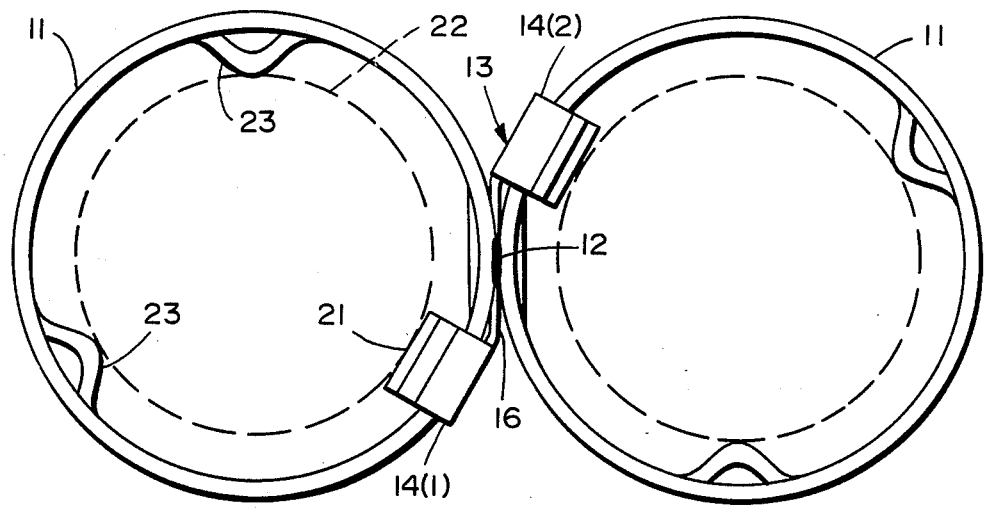
FIG. 1 is a plan view of a pair of adjacent ferrules of a spacer according to the invention with the spring component of the invention mounted thereon.

A pair of adjacent and abutting ferrules 11 are shown in plan view in FIG. 1, the abutting walls of which are joined together as by welds 12 at their top and bottom edges.

Any selected number of pairs of ferrules 11 may be arranged in abutting relation and cojoined to form a spacer providing the required number of fuel rod passages as shown and described in greater detail in the referenced U.S. patent application Ser. No. 410,124.

Mounted on the ferrules 11 is a spring component 13 which has a generally S-shape in plan view as shown in FIG. 1.

Figure 2:
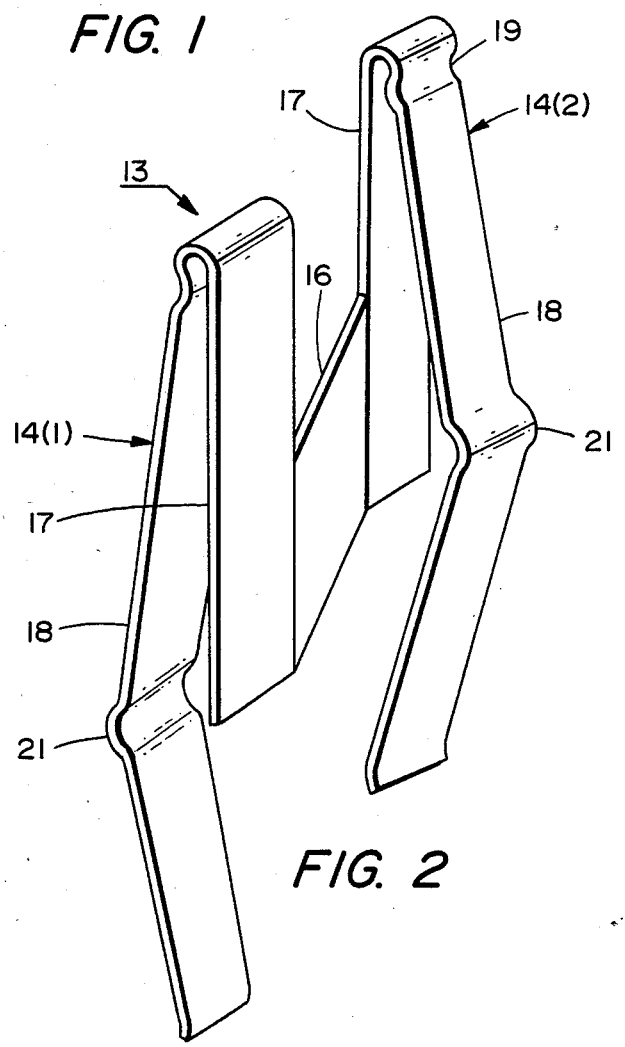
FIG. 2 is an isometric view of the spring component of the invention.

In isometric view, as shown in FIG. 2, the spring component 13 has a generally H-shape and includes a pair of spaced apart, side-by-side spring members 14(1) and 14(2) of generally hairpin like configuration, the adjacent edges of spring members being connected by a retaining strap 16.

Each of the spring members 14(1)/14(2) includes a short straight side 17 connected at its top end to an arched side 18, the connecting strap 16 being attached to the inner, lower edges of the straight sides 17 at similar opposite angles. Each arched side 18 is formed with an inwardly arched bend 19 at its upper end and with a substantially central apex portion having an outwardly arched bend 21. As shown in FIG. 1, the bend 21 contacts the fuel rod or other element 22 (shown in dashed lines) extending through the ferrule 11 and resiliently urges it into contact with spaced rigid stops 23 whereby the element 22 is laterally supported. In preferred form, four such rigid stops 23 are used including an upper pair of spaced stops and a similar lower pair of spaced stops—see FIGS. 3A, 3B and 3C. The stops 23 advantageously may be formed integrally with the ferrule 11 by first punching out a pair of lateral slits 24 (FIG. 3C) defining the location and height of each stop 23 and then deforming the material between the slits 24 in the arched form of the stop 23.

To retain the spring component 13 on the ferrules 11 and to allow the ferrules to be positioned in abutting relation as shown in FIG. 1, the straight sides 17 of the spring members 14(1)/14(2) are positioned along the outer surface of the ferrules 11 and the retaining strap 16 is fitted into facing recesses 26 formed in abutting side walls of the ferrules 11.

Figure 3A:
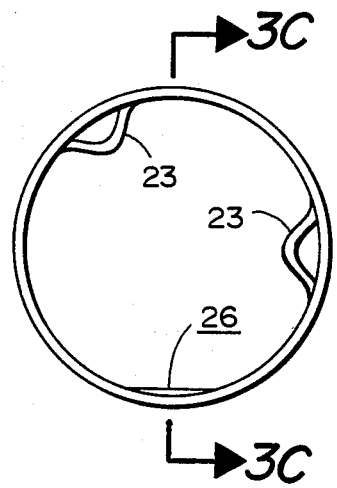
FIGS. 3A and 3B are plan and elevation views, respectively, of a ferrule of FIG. 1.
Figure 3B:
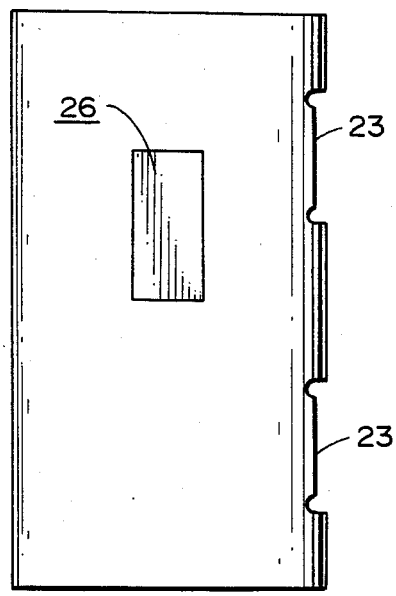
Figure 3C:
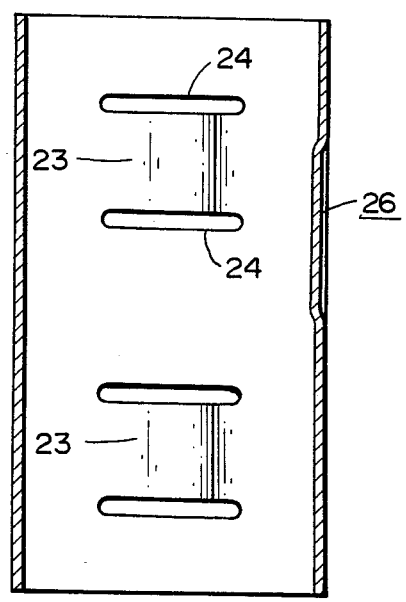
FIG. 3C is a longitudinal section view of the ferrule of FIG. 3A.

The preferred form of such recesses 26 illustrated in the plan, elevation and logitudinal cross section views of one of the ferrules 11 illustrated in FIGS. 3A, 3B and 3C. As therein shown, the recess 26 is formed by deforming inwardly a portion of the wall of the ferrule 11 at the appropriate location and of appropriate size to receive the retaining strap 16. (Alternatively the recesses 26 may be formed by cut outs, however, the deformed wall portion form is preferred because its smoother edges cause less disturbance of coolant flow through the ferrule and ferrule strength is maintained.)

To mount the spring component 13 on the ferrules 11, as shown in FIG. 1, the two ferrules 11 are positioned close together but with space therebetween to pass the retaining strap 16. The hairpin-like spring members 14(1)/14(2) are slipped over the ends of the ferrules 11 (the arched side 18 projecting into the ferrule and the straight side 17 along the outside of the ferrule) and the component 13 is pushed down until the retaining strap 16 is in alignment with the recesses 26. The ferrules 11 are then brought into abutting relation and welded together by welds 12 at each end.

EXAMPLE

In an example design of the invention the ferrules 11 are about 1.2 inches (3 cm) high, about 0.64 inches (16.2 mm) in outside diameter with a wall thickness of about 0.02 inches (0.5 mm). The ferrules 11 are preferably formed of a material of low neutron absorption cross section such as a zirconium alloy, for example, Zircaloy-4.

The spring component 13 is formed of a material having suitable strength, corrosion resistance and resilience characteristics such as a nickel alloy, for example, Inconel. The spring component is about 1.0 inches (2.5 mm) in overall height and about 0.45 inches (11.5 mm) in overall (formed) width, the spring members 14(1)/14(2) being about 0.12 inches (3 mm) in width. The retaining strap 16 is about 0.3 inches (7.7 mm) in height.

I claim:

1. In a fuel assembly for a nuclear reactor including a plurality of elongated elements and a spacer for retaining said elements in lateral position comprising an array of laterally positioned, cojoined tubular ferrules wherein each of said ferrules provides a passage for one of said elements extending therethrough: a spring component for said spacer having a generally H-shape including a pair of spaced apart, side-by-side, spring members of generally hairpin-like configuration, each said spring member having an arched side, said arched sides extending in an opposite direction relative to said arched side of the other spring member, the adjacent edges of said spring members being connected by retaining strap, said spring members extend in a substantially vertical direction, each of said spring members being fitted on the wall of one of a pair of adjacent ferrules whereby an arched side of one said spring members projects into one of said pair of adjacent ferrules and an arched side of the other of said spring members projects into the other of said pair of adjacent ferrules for resilient engagement with the elongated elements extending through said ferrules, said retaining strap being fitten into facing recesses formed in the adjacent walls of said pair of adjacent ferrules, said retaining strap remains outside of the inner surface of said adjacent walls of said pair of adjacent ferrules.

2. The combination of claim 1 wherein at least two laterally spaced relatively rigid stops project into each of said ferrules generally opposite the arched side of the spring member projecting into the ferrule whereby the elongated element extending through the ferrule is laterally supported between said arched side of said spring member and at least two rigid stops.

3. The combination of claim 2 including two vertically spaced pairs of laterally spaced relatively rigid stops projecting into each of said ferrules.

4. The combination of claim 1 wherein said facing recesses for said retaining strap are formed by deforming a portion of the adjacent walls of said ferrules.

5. The combination of claim 1 wherein said facing recesses for said retaining strap are formed by cutouts in the adjacent walls of said ferrules.

6. The combination of claim 1 wherein said retaining strap is connected to said spring members at substantially equal but opposite angles whereby the face of the arched side of each spring member is substantially perpendicular to a radius of the ferrule into which said arched side projects.

7. The combination of claim 1 wherein each of said spring members includes a relatively short substantially straight side connected at its top end to said arched side, said retaining strap being connected between the lower, inner edges of the straight sides of said spring members, said straight sides being positioned along the outer surfaces of said ferrules.

* * * * *